United States Patent
Mahajan et al.

(10) Patent No.: US 11,563,784 B2
(45) Date of Patent: *Jan. 24, 2023

(54) CAPTION ASSISTED CALLING TO MAINTAIN CONNECTION IN CHALLENGING NETWORK CONDITIONS

(71) Applicant: MICROSOFT TECHNOLOGY LICENSING, LLC, Redmond, WA (US)

(72) Inventors: Akash Alok Mahajan, Bellevue, WA (US); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/345,703

(22) Filed: Jun. 11, 2021

(65) Prior Publication Data

US 2022/0159047 A1    May 19, 2022

Related U.S. Application Data

(63) Continuation of application No. 17/116,591, filed on Dec. 9, 2020, now Pat. No. 11,044,287.
(Continued)

(51) Int. Cl.
*H04L 65/403* (2022.01)
*G10L 15/26* (2006.01)
(Continued)

(52) U.S. Cl.
CPC ............ *H04L 65/403* (2013.01); *G10L 15/26* (2013.01); *H04L 43/0811* (2013.01); *H04L 67/01* (2022.05); *H04L 67/61* (2022.05)

(58) Field of Classification Search
CPC .......... H04L 65/00–80; H04L 43/08–43/0894; H04L 67/32–67/322; H04L 67/42; G10L 15/26–15/34
See application file for complete search history.

(56) References Cited

U.S. PATENT DOCUMENTS 9,014,358 B2 * 4/2015 Garcia .................... G10L 15/26
                                                    379/202.01
9,621,851 B2 * 4/2017 Sanso ...................... H04N 7/15
(Continued)

OTHER PUBLICATIONS

"International Search Report and Written Opinion Issued in PCT Application No. PCT/US2021/029262", dated Jul. 30, 2021, 13 Pages.

*Primary Examiner* — Clayton R Williams
(74) *Attorney, Agent, or Firm* — Workman Nydegger

(57) ABSTRACT

Systems are provided for managing and coordinating STT/TTS systems and the communications between these systems when they are connected in online meetings and for mitigating connectivity issues that may arise during the online meetings to provide a seamless and reliable meeting experience with either live captions and/or rendered audio. Initially, online meeting communications are transmitted over a lossy connectionless type protocol/channel. Then, in response to detected connectivity problems with one or more systems involved in the online meeting, which can cause jitter or packet loss, for example, an instruction is dynamically generated and processed for causing one or more of the connected systems to transmit and/or process the online meeting content with a more reliable connection/protocol, such as a connection-oriented protocol. Codecs at the systems are used, when needed to convert speech to text with related speech attribute information and to convert text to speech.

20 Claims, 6 Drawing Sheets

Related U.S. Application Data

(60) Provisional application No. 63/113,652, filed on Nov. 13, 2020.

(51) Int. Cl.
*H04L 43/0811* (2022.01)
*H04L 67/01* (2022.01)
*H04L 67/61* (2022.01)

(56) References Cited

U.S. PATENT DOCUMENTS

| | | | |
|---|---|---|---|
| 10,147,415 B2 | 12/2018 | Cutler et al. | |
| 10,228,899 B2* | 3/2019 | Chisu | H04N 21/4394 |
| 10,742,709 B2* | 8/2020 | Krishnaswamy | H04N 7/155 |
| 2013/0091296 A1* | 4/2013 | Edholm | H04M 3/567 |
| | | | 709/231 |
| 2014/0156271 A1* | 6/2014 | Gammon | H04H 60/02 |
| | | | 709/227 |
| 2016/0219248 A1* | 7/2016 | Reznik | H04N 7/152 |
| 2017/0013233 A1* | 1/2017 | Kuusela | H04N 7/15 |
| 2019/0121851 A1* | 4/2019 | Shires | G10L 21/10 |
| 2019/0394426 A1* | 12/2019 | Segal | H04N 21/42203 |

* cited by examiner

CAPTION ASSISTED CALLING TO MAINTAIN CONNECTION IN CHALLENGING NETWORK CONDITIONS

CROSS-REFERENCE TO RELATED APPLICATIONS

This application is a continuation of U.S. patent application Ser. No. 17/116,591 filed on Dec. 9, 2021, entitled "CAPTION ASSISTED CALLING TO MAINTAIN CONNECTION IN CHALLENGING NETWORK CONDITION," which issued as U.S. Pat. No. 11,044,287 on Jun. 22, 2021, and which application claims the benefit and priority to U.S. Provisional Application No. 63/113,652, entitled "CAPTION ASSISTED CALLING TO MAINTAIN CONNECTION IN CHALLENGING NETWORK CONDITION", filed Nov. 13, 2020, and which applications are expressly incorporated herein by reference in its entirety.

BACKGROUND

Computers and computing systems affect nearly every aspect of modern living. For instance, computers are generally involved in work, recreation, healthcare, transportation, entertainment, household management, etc.

Computers are configured with hardware and software interfaces to facilitate direct user interaction. These interfaces include, but are not limited to, keyboards, mouse devices, touchpads, touch screens, cameras and microphones, which can receive and process user input, including speech and other audio input. Output interfaces include, but are not limited to, display devices, speakers and the like, which can process and render output, including text and audio speech output.

Software interfaces can also be utilized to process and render various user input and output. Examples of software user interfaces include graphical user interfaces, text command line-based user interface, function key or hot key user interfaces, and so forth.

The functionality and utility of a computing system can often be enhanced by interconnecting the computing system with other computing systems via network connections. Network connections may include, but are not limited to, connections via wired or wireless Ethernet, cellular connections, or even computer to computer connections through serial, parallel, USB, or other connections. These connections allow a computing system to access services at other computing systems and to quickly and efficiently receive application data from other computing systems.

The interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction.

A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Some existing applications, such as Microsoft's Teams Application, facilitates the collaboration of different users through an online platform that connects the computing devices of online meeting participants through various types of network connections, including distributed network connections which may include the cloud. Online meeting content that is transmitted during an online meeting may include audio, video and text data that is encoded into data packets that are transmitted between online participant computing systems as electronic communications through the network connections.

In some instances, the communications between the computing systems of online meeting participants are routed through a server on one or more network channels that are configured to use different protocols. For instance, some electronic communications used for video and audio content are often transmitted via UDP (User Datagram protocol). UDP is protocol that is generally viewed as a lossy and connectionless type protocol. Other electronic communications, such as text, are generally transmitted over a connection-based protocol, such as TCP (Transmission Control Protocol), which is generally viewed as a less lossy protocol than the UDP protocol.

UDP is generally desired over TCP for audio and video since it is faster than TPC. In particular, the transmission rate for audio over UDP (e.g., about 10-60 Kbit/s) is an order of magnitude faster than text transmissions over TCP (e.g., about 0.1 Kbit/s). On the other hand, TCP is sometimes desired over UDP, particularly for text, because it is generally more reliable than UDP. For instance, the TCP protocol ensures that its data packets are both received and properly ordered by the receiving device(s). In contrast, the UDP protocol does not. A system transmitting packets over the UDP protocol does not track whether their transmitted data packets are ultimately received by a recipient device, nor the order in which they are received or presented at the recipient device.

When there are connectivity problems, such as variations in available bandwidth, signal interruptions or other problems that negatively affect delivery of the transmitted packets, the presentation of the incoming media will experience 'jitter' or a choppy presentation of the data at the recipient/rendering device(s). A choppy presentation refers to the rendering of data that omits or skips portions of the data due to a 'lossy' connection. 'Jitter' refers to the presentation of the data packets out of order. It will be appreciated that jitter and lossy connectivity issues can have a very negative impact with online meetings by causing some of the words in the online content to be omitted or rendered inaudibly and/or out of order.

For at least these reasons, existing systems that facilitate online meetings currently face challenges associated with providing reliable communications between meeting participants when the connected user systems are subjected to challenging network conditions such as poor connectivity. Furthermore, even when systems are configured to use captioning with their online meetings, these existing systems may still experience degraded communications in real-time meeting experiences when the participants cannot hear each other properly due to connectivity issues that affect the audio transmissions. Accordingly, there is an ongoing need and desire to improve the reliability of transmitting online meeting content during online meetings that are subject to challenging network conditions, even for systems that are capable of using captioning.

Some known systems enable a server to independently detect network connectivity problems in a video/audio session between parties and enable the server to transcribe received audio into text to be sent to the intended recipients.

However, such systems do not address or resolve problems in getting the audio communications to the server in the first instance, such that the audio may already be corrupted or lossy before it is received at the server, such that the errors in the audio are persistent in the transcription.

Other known systems enable end nodes to independently determine whether a change should be made in its communication settings (to transcribe audio into text, for instance) to help facilitate more reliable communications that are sent to the server and routed to another end user system. Such systems, however, are unable to determine whether changes should be made based on conditions experienced at the other remote systems and are unable to manage the configurations of other end nodes that may be experiencing trouble receiving/processing the data being sent.

Accordingly, there still continues to be an ongoing need and desire for improved systems and techniques for managing network communications and for providing centralized mitigation controls for such communications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments are provided for managing dynamic changes in electronic communications between systems of online meetings in an effort to mitigate challenging network conditions.

In some embodiments, online meeting communications (including audio speech communications) are transmitted over a lossy connectionless type protocol/channel, such as UDP to one or recipient computing systems. Then, in response to detected connectivity problems with one or more client systems involved in the online meeting, which can cause jitter or packet loss, for example, an instruction is dynamically generated and processed for causing one or more of the client systems to activate codecs for transmitting and/or processing the online meeting content (including the audio speech communications) with a more reliable connection/protocol, such as a connection-oriented protocol like TPC. This instruction may be generated by the server system and/or one of the meeting participant systems in response to detecting the connectivity issues. The connectivity issues may be detected automatically and/or in response to user input.

In some instances, the client system that generates and transmits the online meeting content will, in response to the instruction(s), activate appropriate STT (text-to-speech) codecs/applications to convert online meeting content comprising audio voice content into text and transmit the content (which is newly converted from audio to text) over a TCP channel rather than as audio over the UDP channel that was previously used to transmit the online meeting content.

Likewise, in some embodiments, and also in response to the instruction(s), one or more receiving/rendering systems will activate/utilize appropriate TTS (speech-to-text) codecs/applications to convert the text received over the TCP channel into audio voice content and will render the audio through one or more speakers.

In other embodiments, the receiving system(s) may utilize appropriate codecs to process and render the text as textual message content on a visual display, rather than, or in additional to, converting the text back into audio content with the STT codec(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
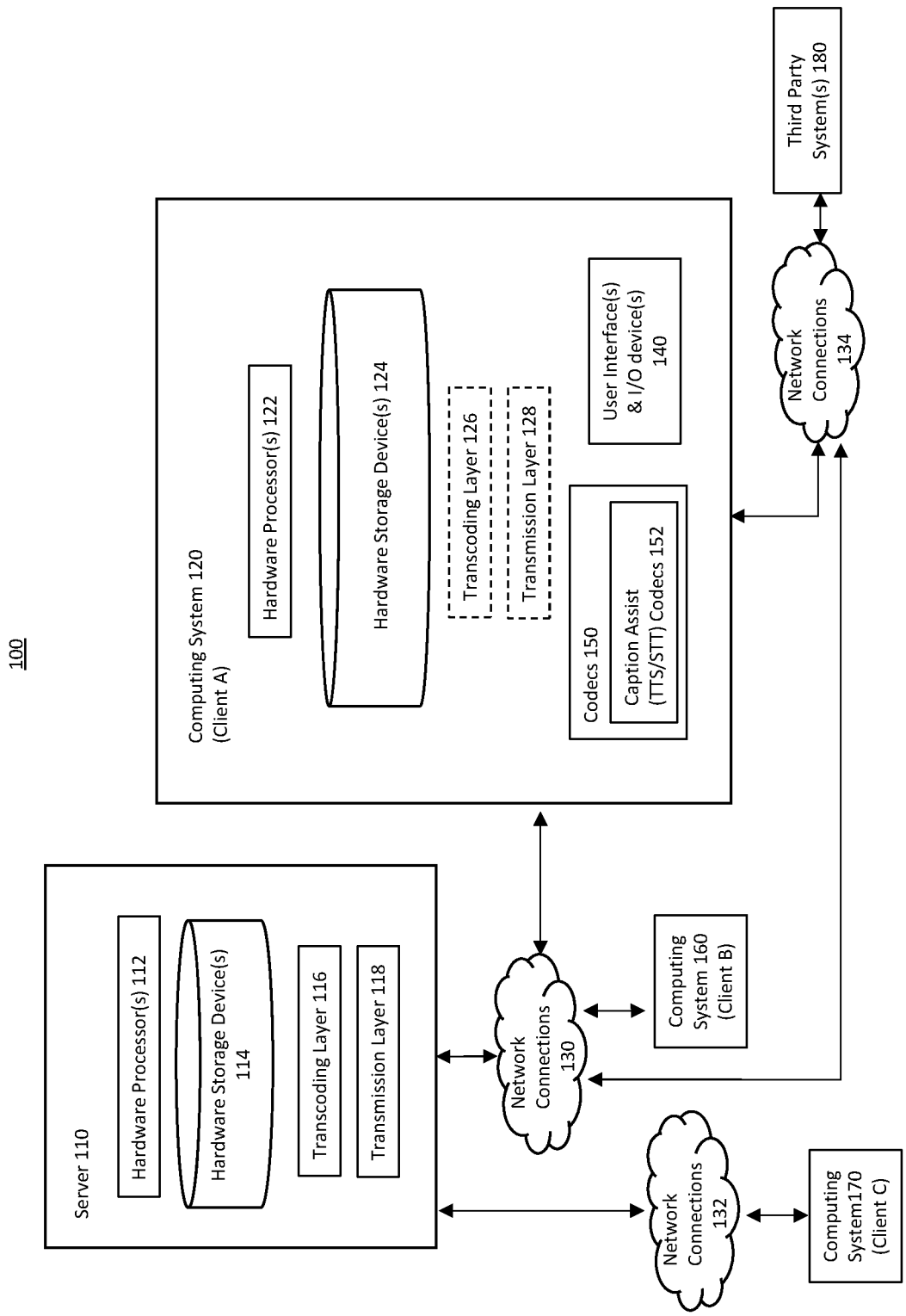
FIG. 1 illustrates a computing environment in which a server facilitates electronic communications between different client computing systems and in which aspects of the current invention may be found or implemented.

Various embodiments are described herein for facilitating and managing communications between connected systems of an online meetings and for facilitating improved reliability in transmitting online meeting content between online meeting participant systems in an effort to mitigate challenging network conditions.

In some embodiments, online meeting content comprising speech is converted from an audio format to a text format in response to instructions received from a server that detects network connectivity issues that would negatively affect transmission of the audio to one or more recipient device(s), and prior to transmitting the content to the recipient device (s), thereby utilizing caption assisted and directed functionality to improve reliability of transmitting the online meeting content and to prevent the loss of data being rendered at recipient systems during online meetings subject to challenging network conditions.

Some embodiments are directed to methods and systems implemented by client systems for dynamically changing codecs, channels and/or protocols utilized to process and transmit and/or render online meeting content in response to instructions received from a server system during an online meeting, responsive to detected connectivity issues/problems.

Other embodiments are directed to server systems and methods for dynamically generating the instructions that are sent to the client systems, in response to detected connectivity issues, and that are operable to change the codecs, channels and/or protocols utilized during the online meetings.

The disclosed embodiments provide many technical advantages over existing systems and techniques used to manage online meetings and communications. Initially, it is noted that the disclosed embodiments may be used to automatically transition between different types of communication channels and protocols used to transmit online content (particularly online speech content) in such a manner as to improve reliability of the data transmissions of that speech content when experiencing negative connectivity issues, so that data packets (such as audio packets transmitted over UDP) are not lost or disordered due to connectivity issues (e.g., poor connection, interruptions in connection, bandwidth restrictions, etc.) by causing the audio to be converted into text and transmitted over a more reliable channel and protocol such as TCP, while also facilitating faster communications over UDP for audio when the negative connectivity issues are not detected or present.

In some embodiments, the disclosed invention facilitates further technical advantages over existing systems by providing techniques to centrally coordinate and control the activation of certain codecs (e.g., TTS codecs and STT codecs) used to convert audible speech content into text content and to convert text content into audible speech content. By coordinating the activation and use of these codecs from a central location, e.g., the server, it is possible to improve overall communications between the different connected devices of an online meeting that is routed through the server. It is also possible to avoid wasting resources that would otherwise be consumed prematurely by activating codecs for use that do not need to be used and/or until they need to be used.

Attention will now be directed to FIG. 1, which illustrates a computing environment 100 in which a server 110 facilitates electronic communications (e.g., an online meeting and transmissions of online meeting content over different channels) between one or more different client computing systems (120, 160, 170). These client computing systems are also referred to herein as client system A, client system B and client system C, respectively.

As illustrated, the server 110 includes one or more hardware processor(s) 112 and hardware storage device(s) 114. Each of the computing systems (120, 160, 170) also include one or more hardware processor(s) 122 and hardware storage device(s) 124. Even though computing systems 160 and 170 do not presently show all of the same components that are present in computing system 120, it will be appreciated that in some embodiments, computing systems 160, 170, and third-party system(s) 180 are each configured to also include all of the same components that are currently shown in computing system 120. Additionally, in some embodiments, such as a distributed computing environment, the server 110 and/or computing system 120 may incorporate one or more additional computing systems, such as computing system 160, 170 and/or 180.

During implementation of the disclosed and claimed methods of the invention, the hardware processor(s) 112, 122 execute computer-executable instructions stored as executable code on the hardware storage device(s) 114,124, to cause the corresponding server and/or computing systems to implement the corresponding acts of the methods that are being implemented.

During an online meeting, the server 110 facilitates/establishes electronic communications between the different client computing systems (120, 160, 170) through one or more network connections 130, 132. Further discussions about the network connections 130, 132 and the different channels and protocols that may be used to transmit electronic communications will be provided in more detail below, in reference to FIG. 2.

In a short preview, it is noted that the server 110 may establish electronic communications with a plurality of different client to facilitate online communications between the plurality of different client systems. These electronic communications may include different combinations and types of network connections for each client, including different types of channels and protocols used for processing and transmitting online meeting content. The disclosed embodiments also include switching the type(s) of network connections/channels utilized during an online meeting or other communication session, dynamically, in response to detected connectivity issues/problems, to facilitate improved reliability in the data transmissions of the online meeting content.

In some instances, the network connections 130 between the server 110 and a first client computing system (e.g., Client A) may be of a same type/protocol as those used for communicating with a second client computing system (e.g., Client B), such as UDP channel connections, for transmitting audio speech content.

In some instances, the network connections between the server 110 and different client systems (120, 160, 170) may also vary in type of network connections used (130, 132). For instance, the server 110 may use network connections 132 of a first type when communicating with a particular client system (e.g., client C) that are different than those network connections 130 used when communicating with one or more other client systems (e.g., the server may use UDP channels when communicating with Clients A and B, but TCP channels rather than UDP channels when communicating with Client C).

When data is being transmitted to or through the server 110, the server uses a transmission layer 118 to establish the protocols that are used and to manage proper state and status of the different channels used to transmit data to and through the server. The initial channels and protocols to use for transmitting online meeting content may be established during the creation of a session when the client system joins an online meeting, for example.

The transmission layer 118 also tracks the online meeting participant devices connected to an online meeting and properly manages routing of the data packets containing the online meeting content to the appropriate client devices joined on the online meeting. The transmission layer 118 also manages connectivity states of the different devices with the server 110 during online meetings and the connected network communication sessions between the different client systems, for example.

The transmission layer 118 is further configured to monitor network connectivity to identify and assess network connectivity issues associated with variations in bandwidth constraints for transmitting the online meeting content over the network connections and to track packet transmissions to identify, detect and quantify connectivity issues that could negatively impact the quality of transmitting and/or rendering the online meeting content subject to potential packet loss and/or jitter.

In some instances, the monitoring performed by the transmission layer 118 including monitoring variations in the bitrate of data packets being received or transmitted through the server. In other instances, this monitoring includes tracking the identifiers and sequencing of data packets transmitted through the server. This monitoring may also include detecting and analyzing notices from the client systems 160, 170 and/or third parties 180 regarding connectivity problems.

The transmission layer 118 also includes logic for generating instructions to activate and/or use particular codecs 150 for processing, receiving and/or transmitting online meeting content with the particular codecs and/or for utilizing different channels and protocols for processing and receiving, transmitting and/or rendering online meeting content in particular formats.

The transcoding layer 116 is configured to transcode the online meeting content into an appropriate format (text or audio packets for transmission over UDP or TCP channels, for example) and for transmission at a particular bitrate to one or more recipient devices (e.g., computing system 120, 160, 170). In some instances, the server determines the format and bitrate to use for encoding/transcoding data packets into based on detected processing and/or rendering capabilities of each recipient systems (e.g., Client A, B, C) and/or based on bandwidth or other network connection constraints detected for the channels of communication that are being used to communicate with those recipient systems.

The transcoding layer 116 includes, in some instances, TTS (text-to-speech) capabilities and/or STT (speech-to-text) capabilities, for converting online meeting content into text from audio, and/or for converting online meeting content into audio, from text.

The transmission layer 118 and the transcoding layer 116 may each be located entirely at the server 110 and/or at least partially at the client system(s) 120, 160, 170 (as transmission layer 128 and transcoding layer 126, respectively).

The computing systems 120, 160, 170 also include codecs 150 such as caption assist (TTS/STT) codecs 152, which are applications and models configured to convert text to speech and speech to text. These codecs 150 may be selectively activated, when instructed, to switch and/or to use particular codecs to process and communicate online meeting content in a particular format and/or to encode and transmit online meeting content over a particular type of network channel having particular protocols and/or to decode and process/render online meeting content received over a particular type of network channel having particular protocols during an online meeting.

In some instances, the codecs 152 in a transmitting end client system that generates content are specifically configured with speech to text functionality, to generate text representing the speech, as well as to identify/extract prosodic and phonetic features from the speech that can be transmitted with the generated text as part of the online content and that represent one or more of pitch, duration, pausing, loudness, tone, inflection, style, or other speech attribute(s)/information. Additionally, the codecs 152 in a receiving end client system that receives the online content are configured with text to speech functionality, to generate audio speech corresponding to the text and any associated prosodic and/or phonetic features received with the text to render the speech in an intended fashion. The codec(s) 152 may also be configured to perform language translation, to translate the text and or audio into different languages.

The generation of instructions to use or to switch the codecs being used by the client system(s) are automatically triggered at the server, in some instances, dynamically in response to the server's transmission layer 118 detecting one or more connectivity issues in the electronic communications between the server and the client systems that negatively impact quality for rendering content of the online meeting at one or more of the client systems.

The detection of connectivity issues may include, for instance, detecting a packet loss or jitter in the electronic communications and/or a change in bandwidth availability for transmitting/receiving communications between the server system and either of the sending/receiving client system(s) 120, 160, 170.

Detecting connectivity issues may also include receiving/detecting user input entered at either the sending or receiving computing systems used for the online meeting. This user input may be received, for instance, at a user interface 140 of a client system when a meeting participant visually or audibly detects problems with rendering of the online meeting content over a speaker and/or display. For instance, if a user detects flaws in the audio being rendered on a speaker and/or sees jittery/choppy video on their display, they may select a connectivity issues button (not presently shown) that is displayed within an online meeting interface (not presently shown). In response to a user selecting this button, the client system generates a notice that is sent to the server to notify the server of the connectivity issue/problem.

The client system may also independently monitor for and detect connectivity issues, using the functionality of the transmission layer 128, which may be similar to the transmission layer 118 functionality, as described above. By way of example, the client system may automatically detect connectivity issues that negatively affect transmission or rendering of the first online meeting content (e.g., detecting missing packets or a decrease in bitrate of the received packets) and may responsively/automatically notify the server of the detected connectivity issues to trigger the server to automatically generate the instruction(s) described herein.

The client systems present/render the online meeting content at or more user interfaces(s) 140 after decoding/processing the content with their transcoding layer 126 by using the appropriate codecs 150 (e.g., applications or modules) required to process and format the content, as instructed. The codecs 150 can also be used to process/encode the online meeting content prior to transmitting it to the server. For instance, a system can use video and audio codecs to encode/decode video and audio data packets. Likewise, other codecs can be used to encode/decode text data packets.

In some embodiments, the codecs 150 also include trained machine learning models, such as trained TTS and/or STT models that are accessible locally within the storage devices 124, and/or remotely through third party systems that are trained to convert text to speech and speech to text, respectively, for speech in one or more languages and styles. For instance, the TTS models are trained, in some instances, to generate/render audio from text with one or more distinct/personalized voices that present the audio in one or more predetermined speaking styles and/or languages.

Some codecs 150 may also be configured to convert audio from one language into another language, in either a text format or an audio format. The client system may store and/or access a plurality of different models that are trained to generate/transform audio with different voices/styles/languages.

Although not shown, the server 110 may also include access to these TTS models, locally in storage or remotely through third party systems, that it may selectively use when transcoding the meeting content. The system may also be aware of the available codecs and models that the different client systems can use and can generate appropriate instructions to the client systems to activate, use or switch to using, when it is determined to be appropriate (e.g., responsive to client/user preferences and constraints, as well as in response to detected network connectivity issues).

In some instances, the instructions received from the server specify the particular codec(s) to use and/or the manner for processing the online meeting content specifically identify the TTS model(s) to use and/or the personalized voice(s)/speaking style(s)/language(s) to use for processing, transmitting, receiving and/or rendering the online meeting content. The client systems may accept and comply with the instructions. Alternatively, the client systems may reject one or more of the received instructions due to user input and/or system constraints, as will be described in more detail below.

When online meeting content is first received and processed by a sending computing system (e.g., system 120), the content is encoded into a particular format and it is transmitted to one or more recipient devices through the server 110, where it may under further transcoding (changes in format or bitrate) and from where it is ultimately transmitted to the recipient devices (e.g., computing systems 160, 170). For instance, by way of example, when the online meeting content is audio or video content, the client system may encode it into a format suitable for transmission on a UDP network channel with the server. When the content is text, it may be encoded into a format suitable for transmission on a TCP network channel with the server. The client system may initially encode the online meeting content according to instructions received from the server and which may change throughout the online meeting.

Once encoded, the data packets are transmitted to recipient devices (e.g., client systems 160, 170) through the server 110 using a same type of network channel/protocol (e.g., a UDP or a TCP channel type) that was also used to transmit data packets to the server 110 from the sending system (e.g., client system 120), or a different type of network channel/protocol. For example, in some instances, particularly when the data packets undergo additional transcoding at the server 110, the server may use different types of channels/protocols to receive and to send the data packets between the different client systems (e.g., a UDP channel to receive audio packets that are transcoded to text at the server and that are then sent over a TCP channel to the recipient system).

In some instances, the server will transmit the online meeting content that is received, without further transcoding the content, using a same format and bitrate for one or more clients. For instance, the server may transmit audio content that is received to a recipient device without transcoding the meeting content from the audio format into a text format.

Even when the online content is not transformed to text from audio at the server, the server may still transcode the content, however. For instance, content that is received over a first type of network channel/protocol (e.g., UDP) can be transcoded into a different format for more reliable transmission over a less lossy channel (e.g., TCP) due to detected network connectivity issues with the recipient device (e.g., poor connection, bandwidth restrictions or other connectivity issues that make the recipient device unable to receive data packets at the relatively higher UDP bitrate), and/or due to rendering constraints of the recipient device.

The server can determine client configurations and settings by requesting and pulling information from the client and/or by receiving unsolicited information from the client that identifies the client configurations, constraints and/or user settings. In one non-limiting example, if the recipient device has online meeting parameters manually set to render text and not audio due to user selection or automatically due to detected device limitations such as a broken speaker or no speaker interface enabled, the server can detect this by requesting system configuration settings from the client prior to transmitting the online meeting content to the user. Then, based on this information, the server can select the appropriate format/channels to use for transmitting the online meeting content and the appropriate format for transcoding and/or transmitting the online meeting content in.

Changes in system configurations and settings can also be detected in real-time during a meeting by the server and/or a client system to effectuate a change in the format/channels to use for transmitting the online meeting content, as well as to trigger instructions from the server to activate, use, switch the codecs/channels used to process and transmit/receive the meeting content. When changes are made, the server tracks those changes to ensure it knows when to generate and issue new instructions to the different client systems participating in the online meeting.

In some embodiments, the server will transcode the content received from a first client in multiple different ways to use a different format and/or bitrate for each of a plurality of different recipient devices that are sent the same content in different formats (e.g., any combination of an audio format, a text format, a first bitrate, a second bit rate, a UDP format, a TCP format, or other format) over the same and/or different types of network channels/protocols. The server will also generate and send corresponding instructions to the different client systems to use, activate, switch the codecs being used to process the data accordingly.

Then, when the content is received at the different client systems, irrespective of the format(s) it is received in, it will be rendered in one or more different formats at the different recipient systems that activate and use the appropriate codecs, as instructed. For instance, after the content is decoded and optionally transformed according to the instructions received from the server, the different recipient systems may render the same content in one or more different formats at the different recipient systems by applying or foregoing additional processing by the client system codecs, as instructed, (e.g., by rendering the content by all systems as audio, by rendering the content by all systems as text, by rendering the content by all systems as both text and audio, by rendering the content by some systems as audio and by others as text, by rendering the content by some systems as audio or text and by others as both audio and text, etc.)

When the server 110 establishes and monitors the network connections with the different client systems as part of the online meeting session, the transmission layer 118 tracks which channels, protocols and data formats are used for transmitting online meeting content with each of the computing systems. The server also determines, as discussed throughout, when to generate instructions for the clients to activate, switch and/or use different codecs 150 for receiving, transmitting, rendering or otherwise processing the online meeting content by utilizing particular formats, protocols and network channels. Then, when a change is made at a client, and/or with the protocols/channels/formats used to transmit online meeting content, those changes are also tracked by the transmission layer 118 at the server during the online meeting.

It is noted, however, that not all instructions result in specified changes being made. For instance, a server instruction may instruct a receiving system to activate a TTS codec to convert and render text data as audio when presenting the online meeting content. In response, the receiving system may comply and activate the appropriate codecs to receive the online content over a TCP channel and to process/convert the text into audio to render it over a speaker as audio. Alternatively, the receiving system may not comply and may, instead, ignore part of the instruction by only activating appropriate codecs for receiving/processing the data over the TCP channel, while failing to use a STT codec 152 to convert the text to audio. The client system may elect to do this by choosing to render the text as displayed characters on a display rather than as audio over a speaker.

In some instances, the receiving device may choose to ignore part of the server's instructions based on user input received at the recipient system and/or automatically based on constraints at the client system (e.g., determining there is no suitable audio speaker or that the system doesn't have access or licensing permission to use a particular STT codec 152 that is required to convert the text into a specified language, voice profile, style or other audio format that was specified to be used when rendering the content).

When rendering content, the client system may also render the online meeting content in a requested/specified format, as well as a non-specified format. For instance, a system may render content comprising speech in an audio format at one or more speaker(s)), as well as in a text format on one or more display(s), concurrently.

Throughout the online meeting, the different client systems may elect to render the received online meeting speech content (whether received as audio or text) in either the same and/or transformed audio and/or text formats, in despite of and/or based on instructions received from the server system 110.

As mentioned previously, the server 110 may establish different combinations of network connections with different client systems. Some non-limiting examples of different types of network connections will now be described in reference to FIG. 2.

Figure 2:
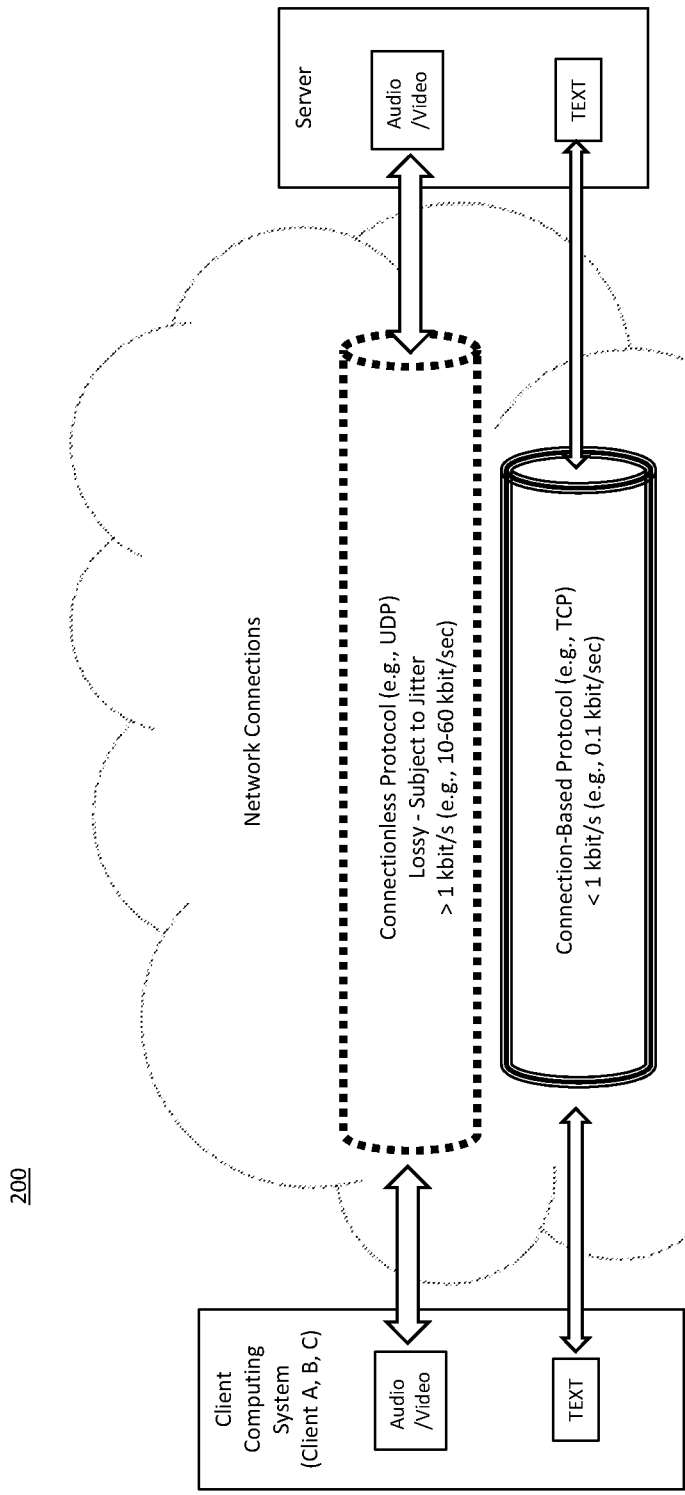
FIG. 2 illustrates a computing environment in which a server facilitates electronic communications with a client computing system over different channels, including a first channel that utilizes a connectionless protocol such as UDP for transmitting audio and video data and a second channel that utilizes a connection-based protocol such as TCP for transmitted text data.

FIG. 2 specifically illustrates two different types of network connections. The first network connection is a connectionless protocol channel, such as UDP, that is somewhat lossy and subject to jitter, particularly in challenging network conditions associated with cause packet loss and latency. This channel is configured to transmit audio/video data packets at a bitrate of about 10-60 Kbit/sec, or faster, between the client computing system(s) and the server.

The second network connection is a connection-based protocol channel, such as TCP, that is slower than the first channel, but generally more reliable than the first UDP channel. In some instances, the TCP channel is not lossy or subject to jitter, or at least less lossy and less susceptible to jitter, than the first channel. In some instances, the second channel is used to transmit text data packets. Notably, when the audio data is converted to text, or formatted to a different language, it is possible for the same content (e.g., speech) to be transmitted in different formats on different channels according to different protocols.

The disclosed and claimed embodiments may use both of the foregoing network connections and/or any other network connections to transmit the online meeting content between different client computing systems through the server. As described herein, the server may also switch the channels and network connections being used during a single continuous and/or uninterrupted online meeting session, involving one or more online meeting participant computing systems.

When a switch to content format or network connection is made, a switch which may require the server to also transcode the online meeting content into one or more different format(s), the server will generate and send corresponding instructions to the different client systems to activate, use, switch or otherwise use different/particular codecs. The instructions may specifically identify the codecs to use.

Alternatively, the instructions may be inferential instructions that specify new network channels/protocols to use for transmitting/receiving the online meeting content and/or for formatting of the online meeting content a particular way, without specifically identifying the codecs to use. Such inferential instructions leave the client systems with discretion to select and use the appropriate (available and relevant) codecs to comply with processing the online meeting content in the specified format and utilizing the specified channels/protocols.

Figure 3:
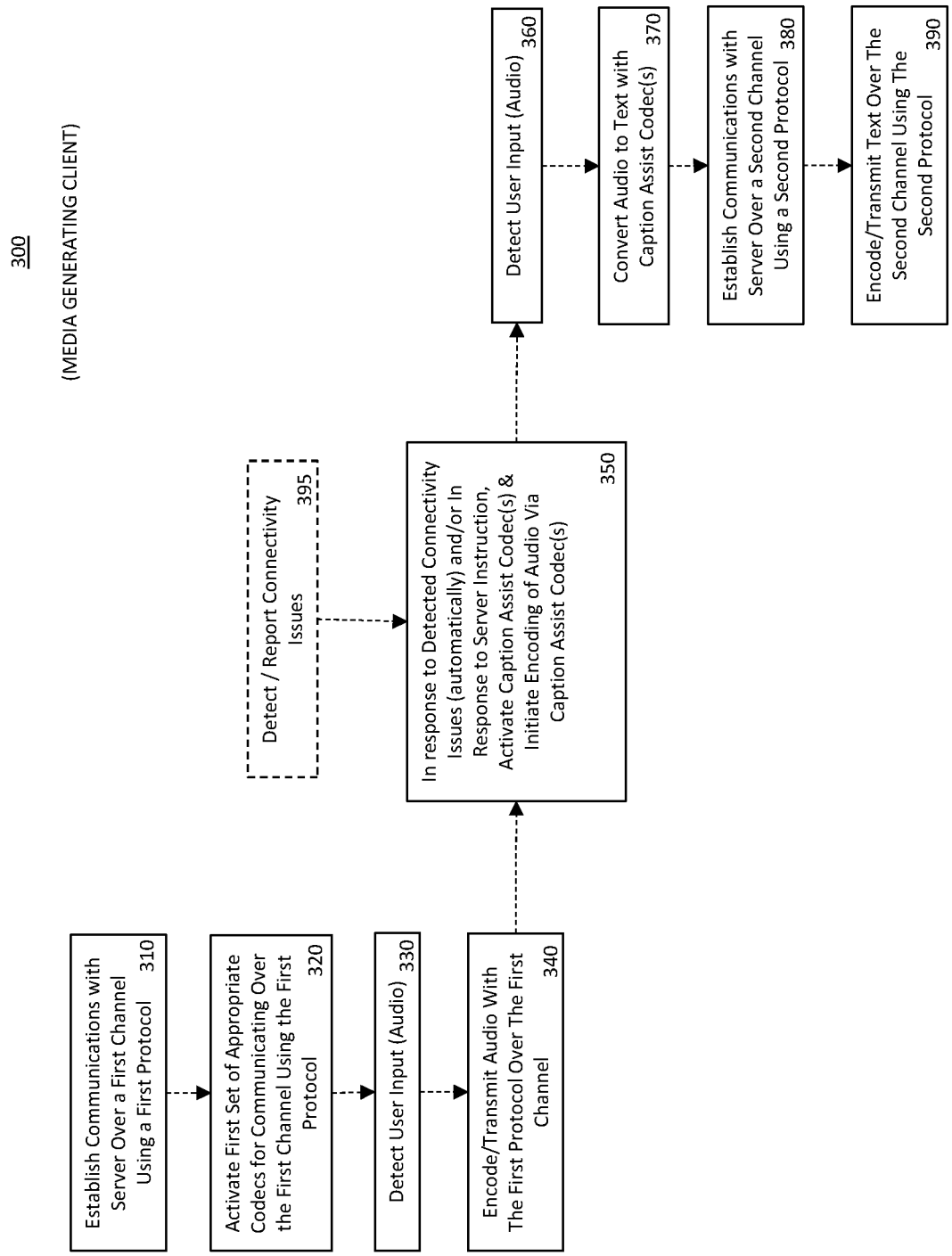
FIG. 3 illustrates a flow diagram of various acts associated with methods performed by client systems for processing and transmitting online meeting content to other meeting participants through a server over different communication channels and for responding to instructions to switch the communication channel/protocol used for transmitting the online meeting content during the online meeting.
Figure 4:
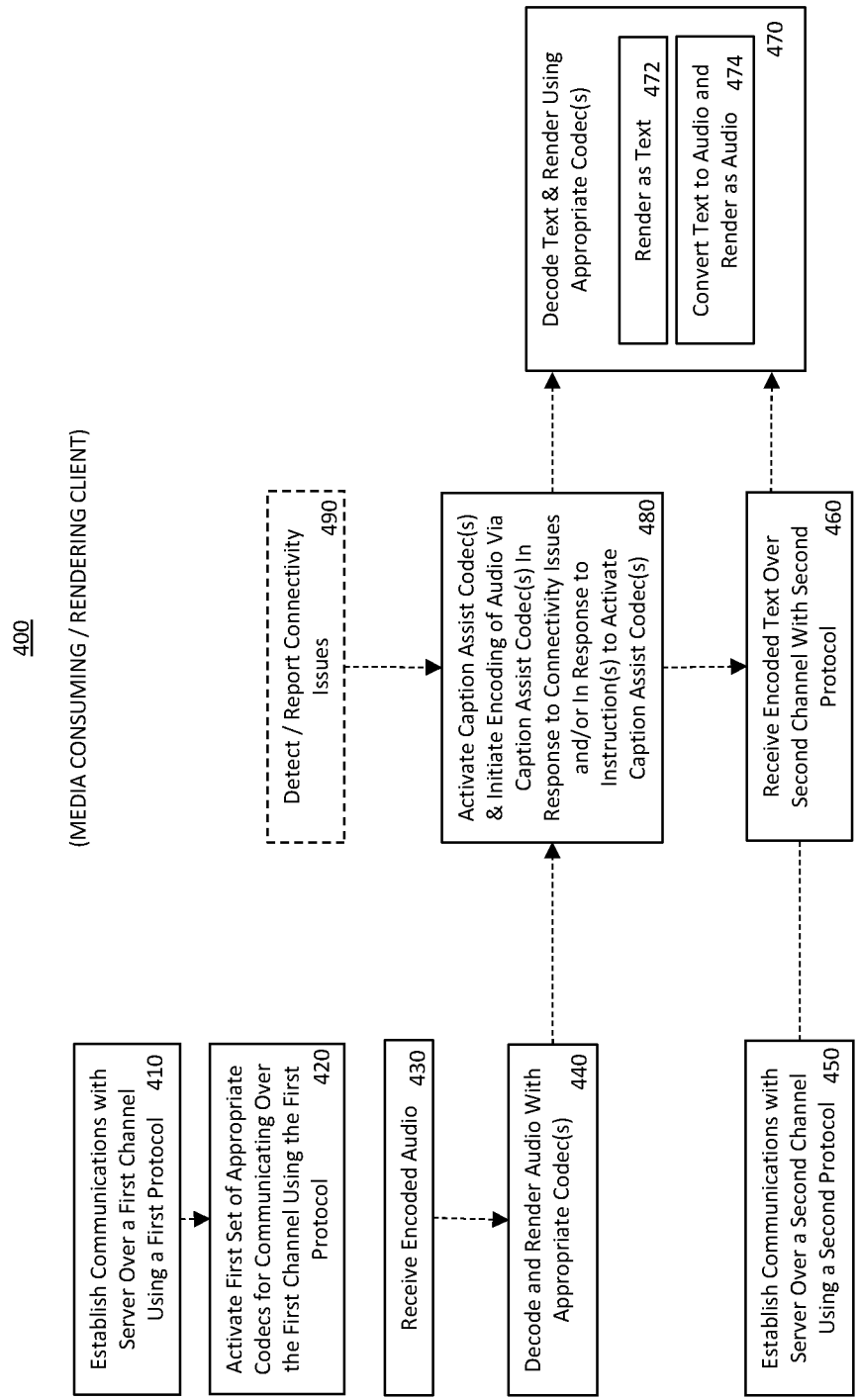
FIG. 4 illustrates a flow diagram of various acts associated with methods performed by server systems for processing and transmitting online meeting content over different communication channels between different client systems and for generating instructions to activate codecs and to cause a switch in the communication channels/protocols used for processing/transmitting the online meeting content during the online meeting.
Figure 5:
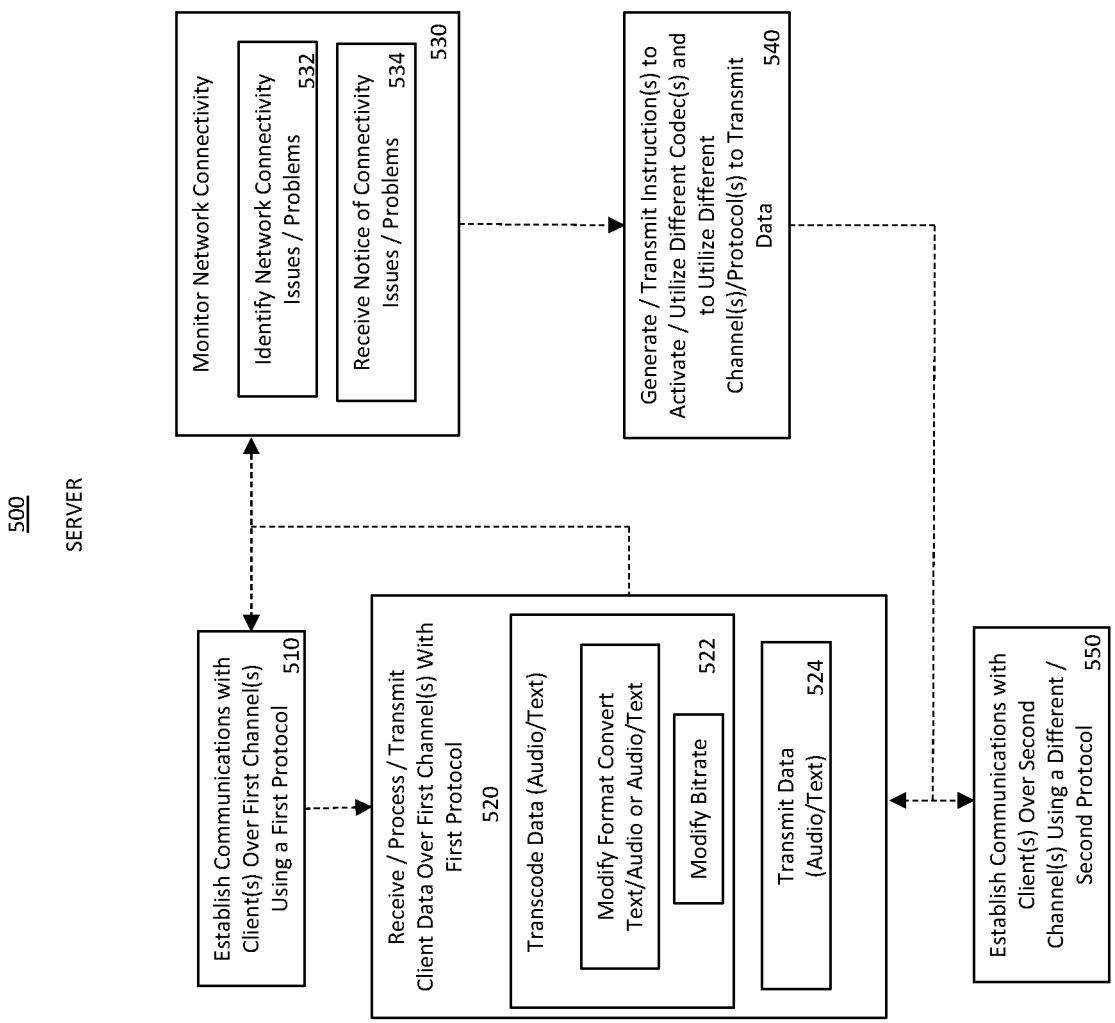
FIG. 5 illustrates a flow diagram of various acts associated with methods performed by client systems for processing and rendering online meeting content received from other meeting participants through a server over different communication channels and for responding to instructions to switch the codecs used for processing and/or rendering the online meeting content during the online meeting.

Attention will now be directed to FIGS. 3-6, which illustrate flow diagrams containing acts associated with methods for implementing the disclosed functionality. FIG. 3 illustrates a flow diagram containing acts performed from the perspective of a media generating client system that generates and sends online meeting content to another system through the server. FIG. 4 illustrates a flow diagram containing acts performed by the recipient media consuming/rendering client system. FIG. 5 illustrates a flow diagram containing acts performed by the intermediary server. And FIG. 6 comprises a composite flow diagram containing acts referenced in FIGS. 3-5 to show sequencing, dependencies and interrelationships between the different server and client systems.

With regard to the following discussions about FIGS. 3-6, it will be appreciated that although a certain order of processes is illustrated in the flow charts, no particular ordering is specifically required unless it is specifically stated or required because an act is dependent on another act being completed prior to the act being performed.

Now, with reference to FIG. 3, it is noted that the illustrated flow diagram 300, includes a media generating client (such as computing system 120) establishing electronic communications with a server (e.g., server 110) over a first channel using a first protocol (e.g., a UDP channel) (act 310). This client system also activates a first set of appropriate codecs for communicating over the first channel using the first protocol (act 320). This act may be performed in response to, or independent of, an instruction from the server when establishing an online meeting session with the server, for example.

Then, during the online meeting, the system detects user input, such as spoken audio input received at a microphone of the system (act 330). The system then encodes and transmits the audio with the first protocol over the first channel (act 340). In some instances, the client system may also transform the audio into a different language and/or encode the audio format that is determined to be compatible with capabilities of an intended recipient device, based on instructions received from the server, so that the server does not have to perform this functionality.

In some instances, the client may independently detect connectivity problems based on monitoring a network connection with the server and/or based on user input (act 395). This may generate an instruction at the client to use/activate different codecs for encoding the audio. The client may also be informed of network connectivity issues by receiving instructions from the server to activate and use one or more codecs to encode the audio and/or to initiate different encoding of the audio into a different format (act 350).

Based on the instructions, which are generated in response to the detected connectivity issues, the client converts (act 370) the same or newly detected audio (act 360) into an appropriate format. The system also establishes/utilizes electronic communications with the server that include a second channel that uses a second protocol (act 380) to encode and/or transmit the audio content over. This may include, for example, encoding the audio into text that is transmitted over the second channel to the server. The codec(s) may also extract/generate speech attribute information, such as prosodic and phonetic features associated with the audio/speech that can be transmitted with the text as part of the online content that is transmitted and that represents one or more of pitch, duration, pausing, loudness, tone, inflection, style, or other speech attribute(s)/information associated with the audio that was converted to text. In this regard, new meeting content received at the client system can then be converted into both text and corresponding speech attribute information associated with the audio that was converted into text that is useful for converting the text back into audio of the same/similar style. In some instances, the second channel is a TCP channel and the first channel is a UDP channel. Other types of channels can also be used, as described in reference to FIG. 2.

FIG. 4 illustrates a flow diagram 400 of acts that reflect how a recipient computing system receives and processes online meeting content and how it responds to instructions from a server 110 for changing how to process the online meeting content in response to dynamic, changing and/or challenging network conditions. The recipient computing system described may comprise computing system 160, 170 or third-party system 180, each of which may also be configured as computing system 120.

As illustrated, the recipient computing system establishes electronic communications with a server (e.g., server 110) over a first channel using a first protocol (e.g., a UDP channel) (act 410). This client system also activates a first set of appropriate codecs for communicating over the first channel using the first protocol (act 420). This act may be performed in response to, or independent of, an instruction from the server when establishing an online meeting session with the server, for example.

Then, during the online meeting, the system receives/detects encoded audio (act 430), such as data packets containing audible speech that are decoded and rendered as audio using appropriate/corresponding codec(s) and speakers (or other output devices) at the recipient client system (act 440). These codecs may include any of the codecs 150 that were described above, and which may be used to play audio and/or translate the audio into a different language or style. In some instances, although not explicitly shown, the system can also use codecs to convert the audio into text captions that are rendered on a display during the online meeting concurrently with the rendered audio (act 440).

At some point in time during the meeting, the recipient system may independently detect connectivity problems based on monitoring a network connection with the server and/or based on user input (act 395). For instance, the user at the recipient system may provide input that indicates or reflects a poor network connection or choppy presentation of the media associated with connectivity issues/problems.

This input may cause the recipient system to generate an instruction to use/activate different codecs for decoding/rendering the audio (act 480), such as in a text format that may help the user interpret what is being said more clearly, particularly when trained STT models can be used to intelligently generate or correct missing terms that are not received in a full/proper format at part of the encoded audio. The recipient system may also notify the server of such connectivity issues/problems when they are detected at the recipient system.

The client may also be separately informed of network connectivity issues (act 490) by receiving instructions from the server to activate and use one or more codecs to utilize a different channel to receive the same or corresponding media content over, such as text content that was transcoded/transformed from audio to text, prior to being transmitted to the recipient system. These instructions may be a result of network connectivity issues detected by the server independently of and/or in response to input received from the sending or recipient computing systems.

The recipient system also eventually establishes communications with the server over a different/second channel having a different/second protocol than used for the first channel (act 450). This act may be performed prior to and/or in response to the instructions received in act 480. In some embodiments, this second channel is a TCP channel and the first channel is a UDP channel.

The recipient system also receives encoded text and, optionally, the associated speech attribute information over this second channel that utilizes a different protocol than the first channel (act 460). This text content may be the same online meeting content (e.g., the same speech/words) as the audio content contained, which was referenced in act 430, only formatted differently. Or, alternatively, this newly received content may be completely different online media content that was received and generated subsequent in time by the system that generated and initially transmitted the online meeting content relative to the previously received audio content that was referenced in act 430.

The recipient system also decodes and renders the new text context with one or more appropriate codec(s) (act 470). In some instances, the system uses the codec(s) to decode and render the text in a text format on a display at the recipient system (act 472). In some instances, the system will utilize the codec(s) to, additionally or alternatively, convert the text to audio and render the audio (act 474) on one or more speakers at the recipient system in a particular language and style. The codec(s) may also use the associated speech attribute information that is transmitted with the text, in some instances, to render the audio in the same prosody and phonetic style and language that it was originally presented in at the transmitting client system. Alternatively, the codec(s) can render the audio in a different style, language or presentation than it was originally presented in at the transmitting client system.

As noted previously, the receipt of the content over the different channels and, particularly the processing and rendering of the content with particular codec(s), by the recipient system may dynamically change during an online meeting in response to instructions generated by and received from the server, either explicitly or implicitly, and which instructions are triggered automatically by the server system in response to connectivity issues that affect quality of the online meeting transmissions and/or presentations.

Attention is now directed to FIG. 5, which illustrates a flow diagram 500, with acts from the perspective of a server system, such as server 110, in communication with different client systems (e.g., client systems A, B & C).

As noted, the server establishes electronic communications with one or more client(s) over one or more first channel(s) using a first protocol (e.g., UDP) (act 510). The server may have several UDP channels established with each of a plurality of different client systems, for example, a first client may generate content that is rendered by another client. During an online meeting, each of the client systems may independently generate content that is rendered by other connected client systems. Each of the client systems may also be configured to render the content generated by the other client systems.

The server works as an intermediary and receives, processes and transmits the client data (which may include video, audio and/or text data) generated during the online meeting to the different clients. In some instances, client data comprising audio is received and/or transmitted over one or more first channel(s) of a first type (e.g., UDP) to one or more of the different participant computing systems (act 520). This may include transcoding the audio into different formats, such as different audio formats (e.g., languages, bitrates, etc.). It may also include modifying the audio into a different format, such as a text format. This act may also include changing the format of text content into different formats (e.g., different fonts, languages, bitrates, etc.), as well as changing text into audio.

The server also establishes electronic communications with the same and/or different clients over one or more second channel(s) having different protocol(s) than the first channel(s) (act 550). The server uses and selects the best/appropriate channel(s)/data formatting to use for transcoding the data and transmitting the data to the different clients, based on determining what channels and formats will result in the fastest transmissions of the data to each of the different client with the best reliability (e.g., no data loss and no jitter) or that is at least within a predetermined threshold reliability or QoS (quality of service) associated with transmission bit rate and reliability. The server may also determine the channels/data formatting to use based on explicit user input received at an online meeting interface from a user during the meeting.

During the meeting, the server monitors the network connectivity over the one or more channels with the one or more clients (act 530). During this monitoring, the server may detect network connectivity issues/problems (act 532). These connectivity issues may be associated with data loss or jitter, and may be detected by identifying bandwidth restrictions, client constraints, network transmission errors, packet loss, reductions in the bitrates of ongoing transmissions, and so forth.

Identification of the connectivity issues may also be based on receiving notice of the problems from another source (act 534), such as notices of network problems by third party sources, user input entered at one or more of the online meeting participant systems, notifications generated by the online meeting participant systems independent of user input, and so forth.

The identification or detection of the network connectivity problems can automatically trigger the generation and transmission of instructions for the client system(s) to activate, switch, use or otherwise utilize different codecs to encode, decode, render, transmit, receive or otherwise process the online meeting content and/or to utilize one or more different protocols/channels to transmit or receive the online meeting content (act 540), as described throughout this paper.

The instructions may be implicit instructions when the server establishes new connections with the client systems (act 550) utilizing a different protocol. Additionally, or alternatively, the instructions may explicitly instruct the client system(s) which codec(s) to use to process the online meeting content. The instructions may also instruct how the content is to be rendered.

The server may optionally, determine whether the network connectivity issues warrant a change prior to generating the instructions and/or prior to establishing the different communication channel(s). For instance, the server may determine whether the network connectivity issues (individually or collectively) are of a particular type (e.g., packet loss, packet mis-ordering, user determined quality, bandwidth variations, non-responsiveness, and so forth) and/or quantity (e.g., certain % loss of data packets, certain % of mis-ordered data packets, percentage of change in transmission bitrate, duration of non-responsiveness, and so forth), and/or that they persist for a particularly duration or frequency, and/or that they have been validated prior to generating/transmitting the aforementioned instructions and/or prior to establishing the new/second channels of communication with the client system(s).

By way of example, if an intermittent interruption in bandwidth availability over a first channel (e.g., UDP channel) slows transmissions periodically, but not enough to cause data loss or jitter, due to adequate buffering of the data at the server/client systems, the server may determine to refrain from generating/transmitting an instruction to have the client systems switch the channels/protocols/codecs utilized for transmitting/processing the online meeting content in a different format (e.g., converting audio to text) that is sent over a different channel (e.g., a TCP channel).

During the online meeting, after a change has been made to the formatting of the content and the channel(s) utilized to transmit the content, the server can also generate additional instructions to switch back to the previous configurations (e.g., protocols/formatting), or a different configuration that is determined to be more efficient, more reliable or faster, for processing and transmitting/receiving the online meeting content than the current configuration due to new network connectivity conditions that are detected. The new configurations of protocols/formatting to use in the subsequent switch and that are the basis of the new instructions may be the same configuration that was previously used during the same online meeting or, alternatively, the new configuration may be an entirely different configuration of protocols/formatting that was not previously used in the same online meeting.

The additional instructions can be made to improve the transmission rates and/or reliability of the transmissions due to newly detected network connectivity issues and which may include improved network conditions. In this manner, the current systems can be utilized to dynamically adjust configurations used during online meetings to maximize the efficient and reliable transmissions of the online meeting content.

Figure 6:
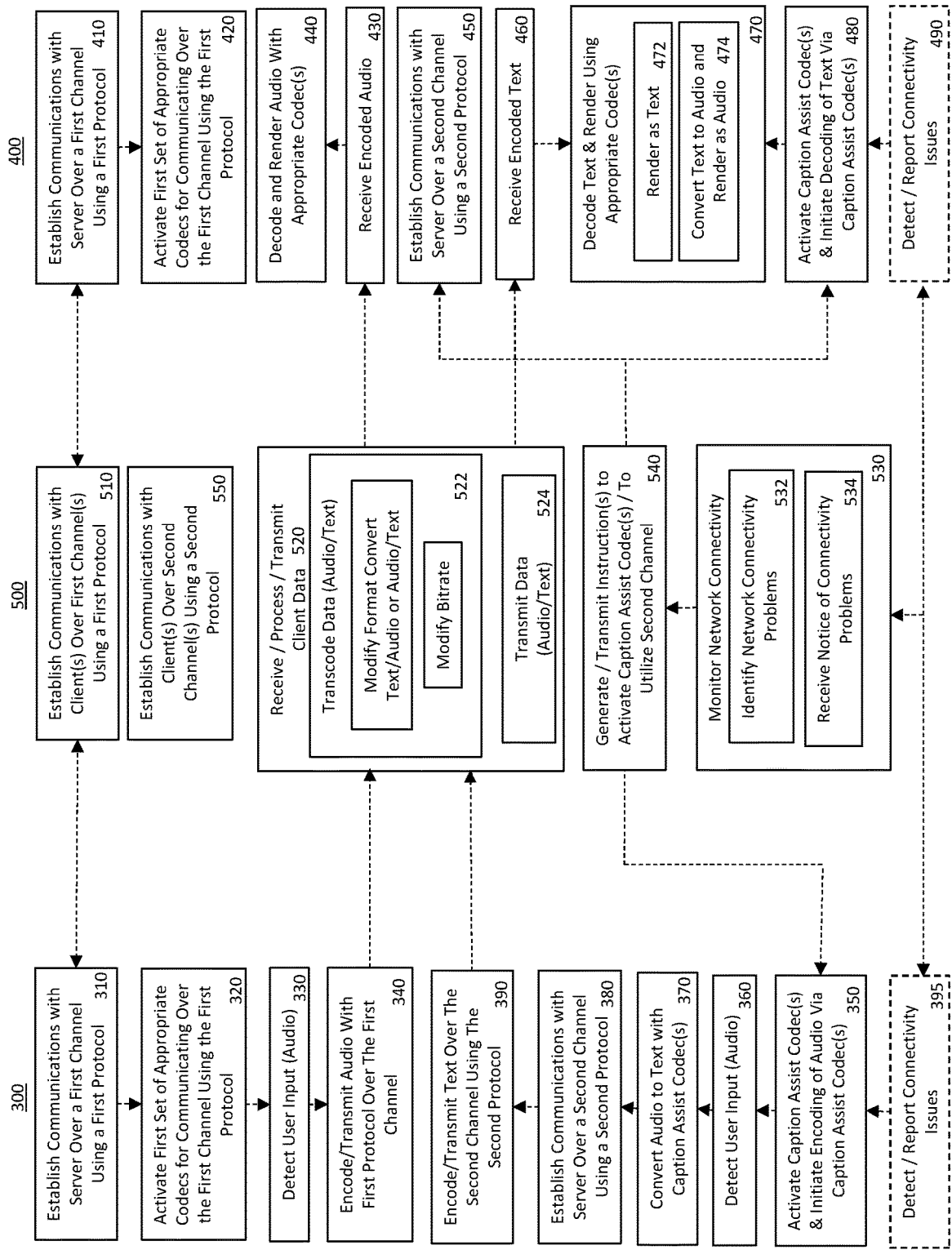
FIG. 6 illustrates a composite flow diagram of various acts associated with methods performed by both client and server systems for processing and transmitting online meeting content over different communication channels and for dynamically generating and/or responding to instructions to activate codecs and to cause a switch in the communication channels/protocols used for processing/transmitting the online meeting content during the online meeting.

Attention will now be directed to FIG. 6, which includes the same foregoing acts described in reference to FIGS. 3-5. However, in this figure, the composite flow diagrams (300, 400, 500) illustrate one non-limiting example of how certain acts can be related by particular dependencies and sequencing of the acts, which is not necessarily evident by nor required by the flow diagrams and embodiments described in reference to FIGS. 3-5. Notwithstanding this possible difference in dependencies/sequencing, the acts illustrated in FIG. 6 will not be restated nor described again, as it is not necessary. In particular, it will be appreciated that the acts shown in this flow diagram 600 incorporate all of the functionality described previously in reference to the acts described in reference to FIGS. 3-5 and throughout the rest of this disclosure.

It will also be appreciated, with regard to the foregoing, that the recited methods and corresponding acts may be implemented in or practiced by a computer system, such as the server and client computing systems described in reference to FIGS. 1 and 2. These systems include one or more processors and computer-readable hardware storage/media such as computer memory and other hardware storage devices. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical hardware storage devices that exclude carrier waves or signals. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical/hardware computer-readable storage media/devices includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A server comprising:
   one or more processors; and one or more hardware storage devices storing computer-readable instructions that are executable by the one or more processors to configure the server to:

receive first online meeting content over a first channel from a transmitting client system that comprises audio data obtained by the transmitting client system and that is encoded and transmitted by the transmitting client system to the server using a first protocol and in an audio data format;

transmit the first online meeting content received from the transmitting client system over the first channel to a receiving client system; and generate and send the transmitting client system an instruction for activating one or more codecs at the transmitting client system, subsequent to receiving the first online meeting content, to initiate transforming and encoding of audio obtained from the online meeting by the transmitting client system into text data and associated speech attribute information, the one of more codecs having speech-to-text functionality.

2. The server of claim 1, wherein the computer-readable instructions are further executable by the one or more processors to configure the server to further receive new online meeting content from the transmitting client as text data with the associated speech attribute information over a second channel that has a lower bitrate and a different protocol than used by the first channel, the new meeting content being received after sending the instruction, the text data having been converted by the one or more codecs at the transmitting client system from audio into the text data in response to the instruction.

3. The server of claim 1, wherein the computer-readable instructions are further executable by the one or more processors to configure the server to transcode the first online meeting content into text at the server.

4. The server of claim 1, wherein the computer-readable instructions are further executable by the one or more processors to configure the server to transmit the first online meeting content received from the transmitting client to the receiving client system using the first protocol and without transcoding the first online meeting content from the audio data format into a text data format.

5. The server of claim 1, wherein the computer-readable instructions are further executable by the one or more processors to configure the server to transmit the first online meeting content received from the transmitting client to the receiving client system using a second protocol that is less lossy than the first protocol and after first transcoding the first online meeting content from the audio data format into a text data format.

6. The server of claim 1, wherein the computer-readable instructions are further executable by the one or more processors to configure the server to generate and send the receiving client system a different instruction for activating the one or more codecs at the receiving client system to initiate decoding of online meeting content with a codec having text-to-speech functionality.

7. The server of claim 1, wherein the generating of the instruction is automatically triggered in response to the server detecting one or more connectivity issues in the electronic communications between the server and the transmitting and/or receiving client systems that negatively impact quality for rendering content of the online meeting at the second client system.

8. The server of claim 7, wherein the detected connectivity issues include packet loss.

9. The server of claim 7, wherein detected connectivity issues include jitter.

10. The server of claim 7, wherein detection of the connectivity issues comprises the server detecting user input entered by a user participating in the online meeting that identifies a connectivity problem.

11. The server of claim 10, wherein the user input is received from the receiving client system.

12. The server of claim 7, wherein the detection of the connectivity issues comprises the server detecting a change in bandwidth availability for transmitting communications between the server and the transmitting client system.

13. The server of claim 7, wherein the detection of the connectivity issues comprises the server detecting a change in bandwidth availability for transmitting communications between the server and the receiving client system.

14. A computing system configured as a receiving client system that receives content during an online meeting, the computing system comprising:

one or more processors; and one or more hardware storage devices storing computer-readable instructions that are executable by the one or more processors to configure the computing system to:

receive and decode first online meeting content during an online meeting between the computing system and a remote transmitting computing system, the first online meeting content being received from a server interposed between the computing system and the remote transmitting computing system in an audio data format;

identifying an instruction, subsequent to receiving the first online meeting content during the online meeting, for activating one or more codecs having text to speech functionality capable of decoding online meeting content received in a text format;

activate the one or more codecs in response to the instruction; and receive and decode new online meeting content for the online meeting with the one or more codecs having the text to speech functionality, the new online meeting content being received in a text format with speech attribute information associated with the text.

15. The computing system of claim 14, wherein the computer-executable instructions are further executable by the one or more processors to cause the computing system to render of the new online meeting content after it is decoded with the one or more codecs in the text format on a display device.

16. The computing system of claim 14, wherein the instruction is received from the server.

17. The computing system of claim 14, wherein the instruction is generated by the computing system.

18. The computing system of claim 14, wherein the computer-readable instructions are further executable by the one or more processors to configure the computing system to generate a notification for triggering the creation of the instructions in response to detecting connectivity issues that negatively affect transmission or rendering of the first online meeting content.

19. A computing system configured as a transmitting client system that transmits content during an online meeting, the computing system comprising:

one or more processors; and one or more hardware storage devices storing one or more computer-readable instructions that are executable by the one or more processors to configure the computing system to mitigate connectivity issues during an online meeting, and by at least configuring the computing system to:

generate and transmit first online meeting content for the online meeting in an audio data format;

identify an instruction, subsequent to transmitting the first online meeting content of the online meeting, for activating one or more codecs to initiate transcoding of new online meeting content for the online meeting from the audio format into a text format, the one or more codecs having speech-to-text functionality;

activate the one or more codecs in response to the instruction;

identify new online meeting content for the online meeting comprising audio and using the one or more codecs to convert the new online meeting content into text and corresponding speech attribute information; and transmit the new online meeting content for the online meeting to the server.

20. The computing system of claim 19, wherein the instruction is received from the server.

\* \* \* \* \*